United States Patent [19]

Vanacore

[11] Patent Number: 4,672,654
[45] Date of Patent: Jun. 9, 1987

[54] PBX SECURITY SYSTEM FOR MONITORING SECURITY GUARD TOURS

[75] Inventor: Vincent D. Vanacore, Boulder, Colo.

[73] Assignees: AT&T Company; AT&T Information Systems Inc., both of Holmdel, N.J.

[21] Appl. No.: 680,932

[22] Filed: Dec. 12, 1984

[51] Int. Cl.[4] .......................................... H04M 11/04
[52] U.S. Cl. .......................................... 379/49; 379/37
[58] Field of Search ...................... 179/2 A, 5 R, 5 P; 340/306, 825.49; 379/37, 49, 106

[56] References Cited

U.S. PATENT DOCUMENTS

| | | | |
|---|---|---|---|
| 3,725,596 | 4/1973 | Maxon et al. | |
| 4,141,006 | 2/1979 | Braxton | 179/5 R X |
| 4,228,424 | 10/1980 | Le Nay et al. | 179/5 R X |
| 4,262,283 | 4/1981 | Chamberlain et al. | 179/5 R X |
| 4,273,961 | 6/1981 | Blank et al. | 179/5 R |
| 4,286,117 | 8/1981 | Schreyer et al. | 179/5 R |
| 4,375,637 | 3/1983 | Desjardins | 179/5 R X |
| 4,459,582 | 4/1984 | Sheahan et al. | 179/5 R X |

FOREIGN PATENT DOCUMENTS

| | | | |
|---|---|---|---|
| 52-4709 | 1/1977 | Japan | 179/5 R |
| 57-25764 | 2/1982 | Japan | 179/2 A |
| 57-53176 | 3/1982 | Japan | 179/5 R |

OTHER PUBLICATIONS

R. Petersen, "Hasler Personnel Protection Systems," Hasler Review, vol. 14, No. 4, Winter 1981, pp. 122–127.
Jeffrey K. Nichols, "Big Atlanta Hotel Uses Automation to Make Guests Feel Welcome", Telephony, Jun. 6, 1983, pp. 30, 31, 34, 36.
Ronald C. Wegner, "The GTD Digital PABX Health Care/Motel Offering", GTE Automatic Electric Journal, Jan. 1980, pp. 2–7.

Primary Examiner—Keith E. George
Attorney, Agent, or Firm—James M. Graziano

[57] ABSTRACT

A security system arrangement utilizing a standard PBX for monitoring a plurality of concurrently administrable guard tours. A control processor of the PBX administers the security monitoring processing operation. This processing operation monitors the activities of tour guards as the guards progress through one or more tours. In particular, a programmable memory defines a plurality of tours. Each tour comprises a finite list of sequentially defined checkpoints where each checkpoint is a designated conventional station set of the PBX. A security controller activates the security system by "dialing" the appropriate feature code at a central control facility, such as an attendant console. The security controller than selects one or more the available tours by "dialing" a tour code. Following the selection and activation of a tour, a tour guard "dials" a check-in code at each checkpoint and progresses sequentially through the checkpoints contained in the list comprising the selected tour or tours. The tour guard has an allotted amount of time in which to reach each of the designated checkponts included in the tour sequence. The tour is successfully concluded when the tour guard sequentialy checks-in within the allotted time at each of the designated checkpoints included in a tour. However, if the proper check-in sequence is not followed or if the allotted time period elapses before the tour guard reaches the next checkpoint in the sequence, an alarm is generated to indicate that the tour sequence is disrupted.

13 Claims, 6 Drawing Figures

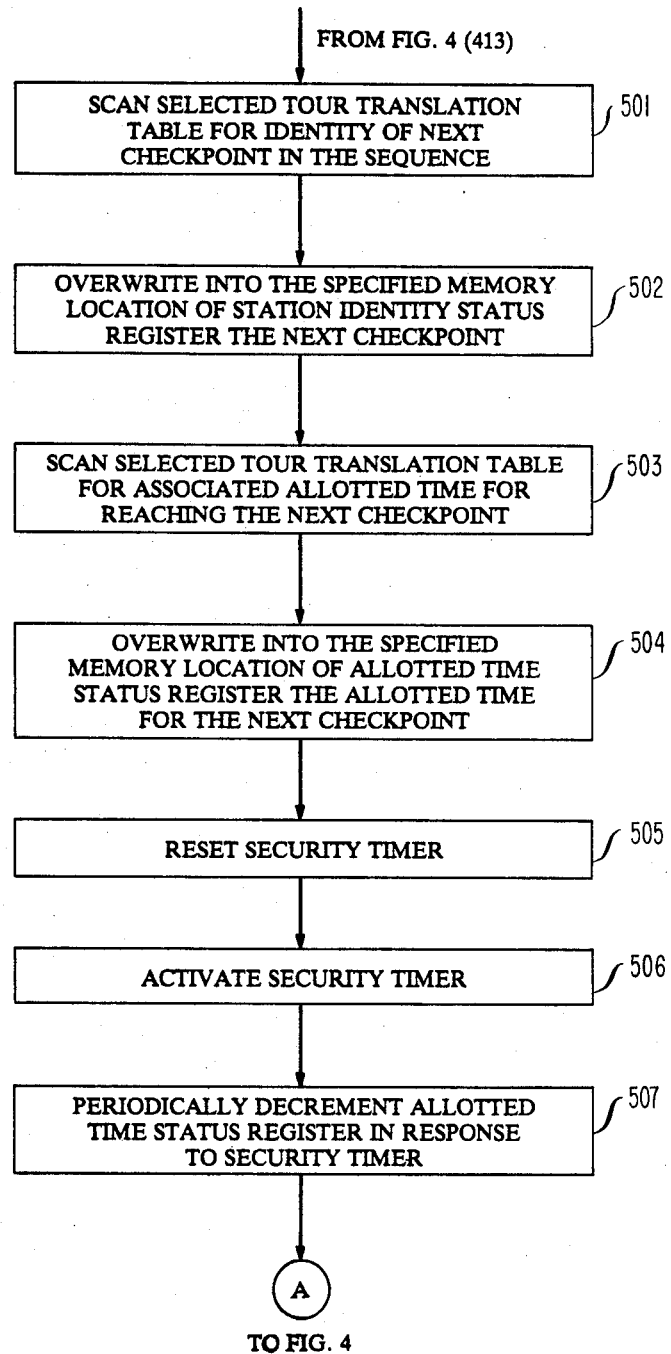

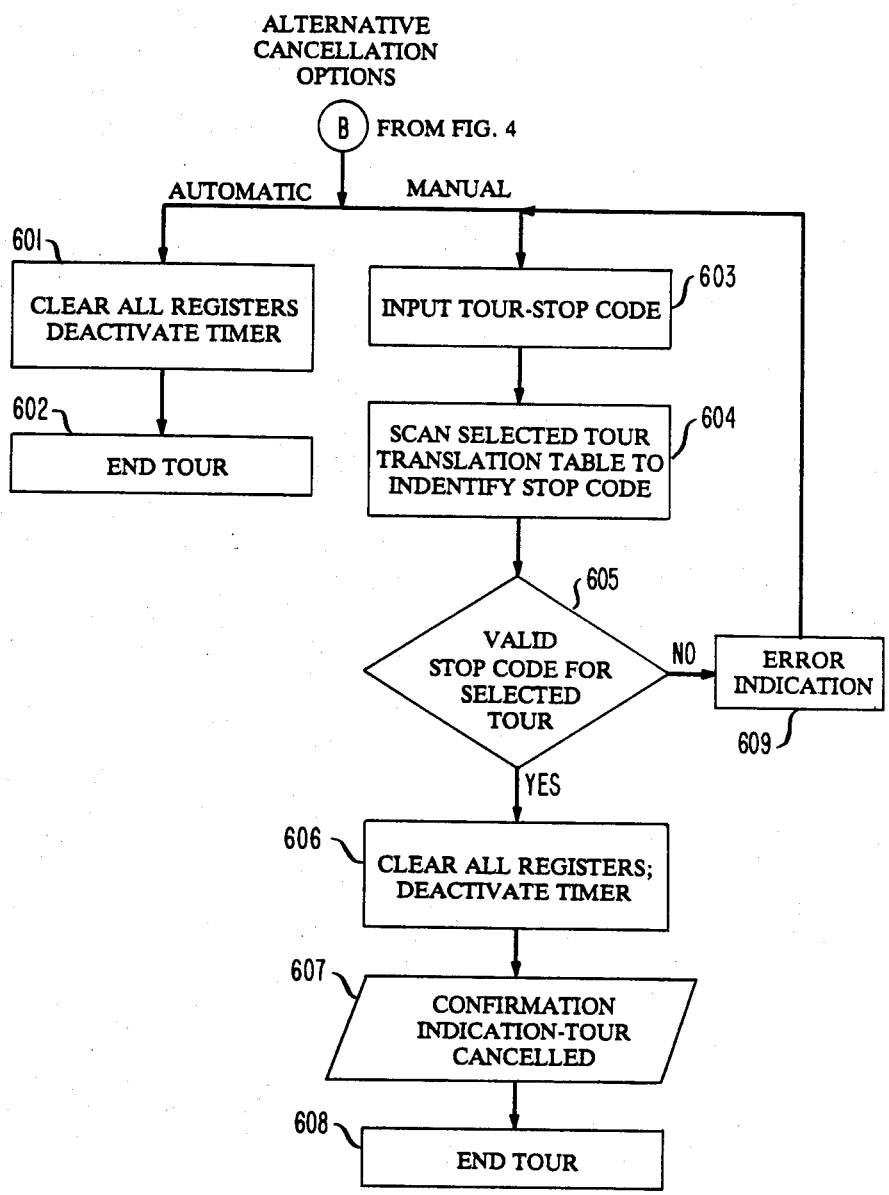

4,672,654

PBX SECURITY SYSTEM FOR MONITORING SECURITY GUARD TOURS

TECHNICAL FIELD

This invention relates to security arrangements and, in particular, to a security arrangement utilizing a typical Private Branch Exchange (PBX) to monitor a plurality of security guard tours.

BACKGROUND OF THE INVENTION

Several types of security arrangements are available to provide security for a variety of buildings. One arrangement utilizes a "breaking and entering" type of alarm system. In this type of arrangement, an alarm is tripped in response to opening a locked door or breaking a window. Adjunct electronic equipment detects the opening and breaking actions which usually indicate unauthorized entry. This type of security arrangement works well to generate an alarm when the system remains active. However, if the adjunct electronic equipment is the subject of tampering, i.e., the alarm is deactivated, no security is provided for the building. These types of security arrangements are usually highly visible and therefore, can be easiy deactivated.

Other security arrangements for buildings utilize an internal security guard to remedy the problem of deactivation of an electronic alarm. The guard tours the entire building and looks for unusual types of activities or circumstances, such as the presence of an intruder. In this type of arrangement, a tour usually includes a number of checkpoints located along the route of the tour. The checkpoints are typically visible hardware devices comprising specialized transmitters and receivers that are hardwired to some type of alarm facility monitoring device. These checkpoints serve as interfaces between the guard and the alarm facility. Several different types of checkpoint arrangements are available.

One type of checkpoint arrangement operates in response to a "key" which locks and unlocks a number of designated lock boxes. In this arrangement, a guard tours the building and checks-in at the various lock-box locations throughout the building. These lock boxes are electronically triggered mechanisms. When a guard unlocks a box, this action generates a signal to an alarm panel. This signal activates an indicator on the alarm panel to identify the location of the guard on the tour route. The indications on the alarm panel represent the guard's progress in the tour.

Another type of checkpoint arrangement utilizes specialized telephone equipment. This telephone equipment is strictly used for check-in purposes only. A direct connection exists only between the telephone and some type of alarm facility. These telephones are not integrated into the internal PBX switching system associated with the building. Therefore, no other call processing for incoming and outgoing calls is available for this telephone equipment. Additionally, the telephone equipment utilized in this checkpoint arrangement is easily detectable since such telephones are usually designated as security telephones either by color or style. A touring guard picks up the receiver at one of the many security telephones to generate an alarm and the alarm facility pinpoints the location of the guard. Each security telephone is independent from the other security telephones since each telephone is independently hardwired to the alarm facility. During a tour, a guard's location is pinpointed only when the guard checks in at any one of the designated security telephones located throughout the building. There is no integral relationship between the telephones utilized in this arrangement.

Several other types of security guard tour arrangements exist having similar structural arrangements. These arrangements have several disadvantages. One such disadvantage is that most of these systems are isolated electronically and communicatively from the PBX system in the building. Therefore, an individual located at an alarm facility monitoring device must take alternative measures to generate an external alarm and alert the appropriate authorities for assistance. The traditional checkpoint stations are not integrated with the internal PBX system.

Additionally, the traditional checkpoint arrangements utilize hardwired adjunct equipment to serve as checkpoints. A tour guard has access to only currently installed checkpoint equipment and only with the inclusion of additional equipment can the tour be expanded or altered. A further disadvantage of the above-described security arrangements is that each hardwired checkpoint is clearly detectable and identifiable (e.g., color, shape, structure). Any potential intruder can easily identify, at any time, a checkpoint. Also, since the alarm facility pinpoints the exact location of a guard when the guard checks in, a tour route is easily identified by observing the alarm facility. An interested observer or intruder can easily learn the route by following the guard on a tour to each of the fixed checkpoints or by observing the alarm facility monitoring device. Only by physically moving the checkpoints to different locations can the actual tour route be modified.

Another disadvantage of the currently available security checkpoint arrangements is that only a single tour loop is administrable at a time since most checkpoint security arrangements in a building provided only single loop structuring. A tour is limited by the available hardwired equipment that operates independently to activate an indication at an associated alarm facility. Although a single tour loop for a small building is adequate, a large building would require more than one tour loop. Concurrent tour execution requires a large amount of duplicated equipment. This equipment consumes extensive amounts of building space, and is costly to acquire and install.

In sum, all the currently available security systems are independent systems which include detectable adjunct hardwired component parts such as lock boxes or designated security telephones. These systems are usually rigidly structured single loop arrangements where each checkpoint operates independently from the other checkpoints located in the building. Security considerations are questionable in view of such a visible and nonflexible security arrangement.

Therefore, it would be advantageous to have a flexible security system which does not require detectable adjunct hardwired equipment and does not require modifications to the building structure to administer one or more concurrent guard tours.

SUMMARY OF THE INVENTION

The disclosed security arrangement overcomes the prior art disadvantages by utilizing a currently installed PBX. The PBX typically comprises a variety of communication devices, for example, standard station sets. A control processor controls interconnections between the stations in response to routine call processing algorithms. A security processing algorithm for monitoring a plurality of guard tours comprises a feature of the PBX. This security processing algorithm is contained in the control processor and includes a programmable memory structure which defines a plurality of concurrently administrable guard tours for the building or buildings served by the PBX. Each tour includes a number of checkpoints. A checkpoint is a designated station set which may be any one of the plurality of station sets typically located throughout a building. Since the designation is recorded only in memory, a designated station set does not appear physically changed nor does it have any other designation which would identify it as a designated checkpoint to an interested observer. Additionally, these checkpoints provide a station set user with routine call processing capability such that incoming and outgoing calls may be made or received during a tour at each checkpoint.

A security controller activates the disclosed security monitoring system by "dialing" the appropriate feature code at a central facility, such as an attendant console. In response to the feature code, the control processor branches from the routine call processing algorithm to the security monitoring algorithm. The security controller then selects one or more of the available tours. Each tour comprises a list of checkpoints known only to the security controller and a touring guard. These checkpoints are sequentially ordered and the tour guard is required to execute his/her tour according to the checkpoint sequence. However, the tour guard may start the tour at any checkpoint in the sequence. This prevents an interested observer from determining the location of the start checkpoint. Once the tour begins, the tour guard must progress through the tour according to the predefined sequence of checkpoints. Therefore, the progress and location of the guard is always known since the checkpoints correspond to the station sets located in the building. Also, the tour guard must proceed to each checkpoint within an allotted amount of time. In particular, following a check-in at each one of the designated checkpoints, the tour guard has only a prescribed amount of time in which to reach each of the next designated checkpoints in the sequence. The guard continues through the timed sequence of check-ins until the tour is concluded at the last checkpoint. Following the last checkpoint, the tour is cancelled.

However, if the proper check-in sequence is disrupted or if too much time has elasped between check-ins at the designated checkpoints, the control processor responds to these conditions and generates an alarm to indicate that the tour is interrupted. This interruption signals a condition that requires investigation.

The security monitoring algorithm is defined by the memory structure, the number of tours and tour configurations may be continually altered and changed so that an interested observer can never be sure which tour is in progress and what checkpoints are included in a tour currently in progress.

Additionally, since the security system is integrated with the standard PBX system, this security guard tour monitoring system is not communicatively isolated from making connections to other PBX stations. Therefore, if a guard requires assistance during the tour, the guard may call any station location for assistance from the checkpoint.

This PBX security system arrangement utilizes the existing station equipment as checkpoints. No adjunct hardware or equipment is required, and since the station sets are conventional, an interested observer would find it difficult to pinpoint the checkpoints. Additionally, the security monitoring algorithm provides flexibility in the tours and tour configurations. Such flexibility while utilizing conventional station equipment may defeat any interested observer from determining the exact checkpoint sequence and provides a more protected security arrangement.

BRIEF DESCRIPTION OF THE DRAWING

FIGS. 3-6 illustrate in flow chart form, the operation of the security monitoring algorithms.

DETAILED DESCRIPTION

Figure 1:
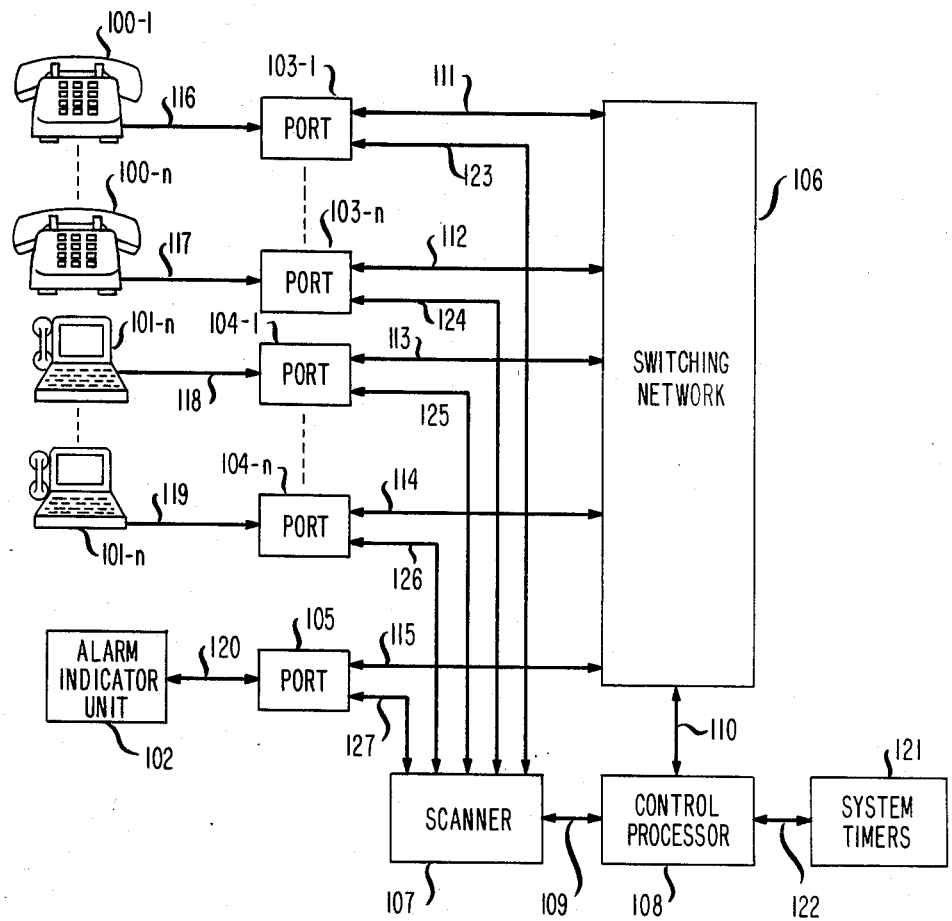
FIG. 1 illustrates a typical PBX.

FIG. 1 discloses a typical private branch exchange (PBX) comprising a plurality of communication devices such as station sets 100-1 through 100-n, digital terminal equipment 101-1 through 101-n, and alarm indicator unit 102. Alarm indicator unit 102 can be any one of a variety of devices such as an alarm panel or an attendant console. These communication devices connect over paths 116 through 116-n, 118 through 118-n and 120 to associated port circuits 103-1 through 103-n, 104-1 through 104-n, and 105.

Port circuits 103-1 through 103-n, 104-1 through 104-n, and 105 interface with switching network 106, scanner 107 and control processor 108. Control processor 108 is of the stored-program type and controls the interconnections between the communication devices of FIG. 1. For ease of discussion, the remainder of this description uses the term station to refer to the various types of communication devices. Control processor 108 includes main memory 108-a. Main memory 108-a contains various call processing algorithms which are implemented in response to stimulus received from the associated stations. A stimulus may be an "off-hook" or "on-hook" condition of an associated station. Scanner 107 operates under control of control processor 108. Scanner 107 scans, over paths 123 through 123-n, 125 through 125-n and 127, ports 103-1 through 103-n, 104-1 through 104-n, and 105 to detect the appearance of a stimulus indication (e.g., "on-hook" or "off-hook") as generated from any one of the associated stations 100 through 100-n, 101 through 101-n and 102. The ports 103-1 through 103-n, 104-1 through 104-n, and 105 receive signals over paths 116 through 116-n, 118 through 118-n and 120 from the associated stations 100-1 through 100-n, 101-1 through 101-n and 102. These signals indicate the condition of the associated stations as generated in response to a stimulus. Scanner 107 detects each change in stimulus (e.g., "on-hook" to "off-hook") and applies an indication of the stimulus over path 109 to control processor 108. Processor 108 responds to this indication and implements routine call processing algorithms in response to the received stimulus. Processor 108 generates control information to establish interconnections between stations. Following the establishment of these interconnections, switching network 106 serves to exchange information, i.e., "voice or data" between the stations associated with each interconnection. Switching network 106 is controlled by control processor 108 over path 110. Processor 108 additionally controls system timers 121 over path 122. System timers 121 comprise a plurality of decremental timers (not shown) which start decrementing in response to some specified stimulus. These decremental timers provide time-monitoring functions for PBX operations having time-dependent activity.

Processor 108 controls both the interconnection between stations and the exchange of "voice or data" between the interconnected stations via switching network 106. Processor 108 contains the call processing algorithms which administer the various interconnections. These call processing algorithms comprise a list of stored instructions which direct routine call processing operations. In addition to routine call processing algorithms, which serve to originate and complete interconnections between stations, main memory 108-a in control processor 108 also contains various feature processing algorithms. These feature processing algorithms also comprise lists of instructions that specify processing operations. Each separately identifiable feature processing algorithm is associated with a service request which is typically identified by a specified "dialed" feature code. When a subscriber or attendant requests a particular feature, control processor 108 accesses main memory 108-a in response to the "dialed" feature code and implements the appropriate algorithm to satisfy the request. In particular, processor 108 branches from the routine call processing algorithm to the requested feature processing algorithm to serve the request.

One of the features available to a PBX subscriber is a security system for monitoring guard tours. This security system utilizes the conventional equipment in a standard PBX. A security algorithm provides the monitoring operations for one or more guard tours where each tour comprises a defined set of sequential checkpoints. A tour guard checks in at a first checkpoint by "dialing" a check-in code. This identifies the guard's presence at a checkpoint. A checkpoint may be any one of the communication devices illustrated in FIG. 1. For ease of description, assume the checkpoints are typical station sets located throughout a building. These station sets may be used to place outgoing calls and receive incoming calls as well as serve as checkpoints during a guard tour. Following a check-in at the first checkpoint, the tour guard has an allotted amount of time to reach the next checkpoint in the sequence. The tour guard progresses through the tour, sequentially checking in at each checkpoint included in the tour withn the allotted amount of time specified between checkpoints. An alarm is generated if the tour guard does not check-in at the appropriate checkpoint in the sequence and in the allotted amount of time. A control guard at an alarm indicator station such as that illustrated in FIG. 1 responds to the alarm and takes appropriate action. Since a standard PBX is used to provide the security monitoring operation, an observer cannot easily identify those stations serving as checkpoints nor the sequential timing of the stations included in the tour. Prior to describing the operation of the security algorithm: the structure of the tours, checkpoints, and associated allotted times are discussed first since the memory defining these structures is essential to understanding the operation of the security algorithm.

Memory Structure for Tours

Figure 2:
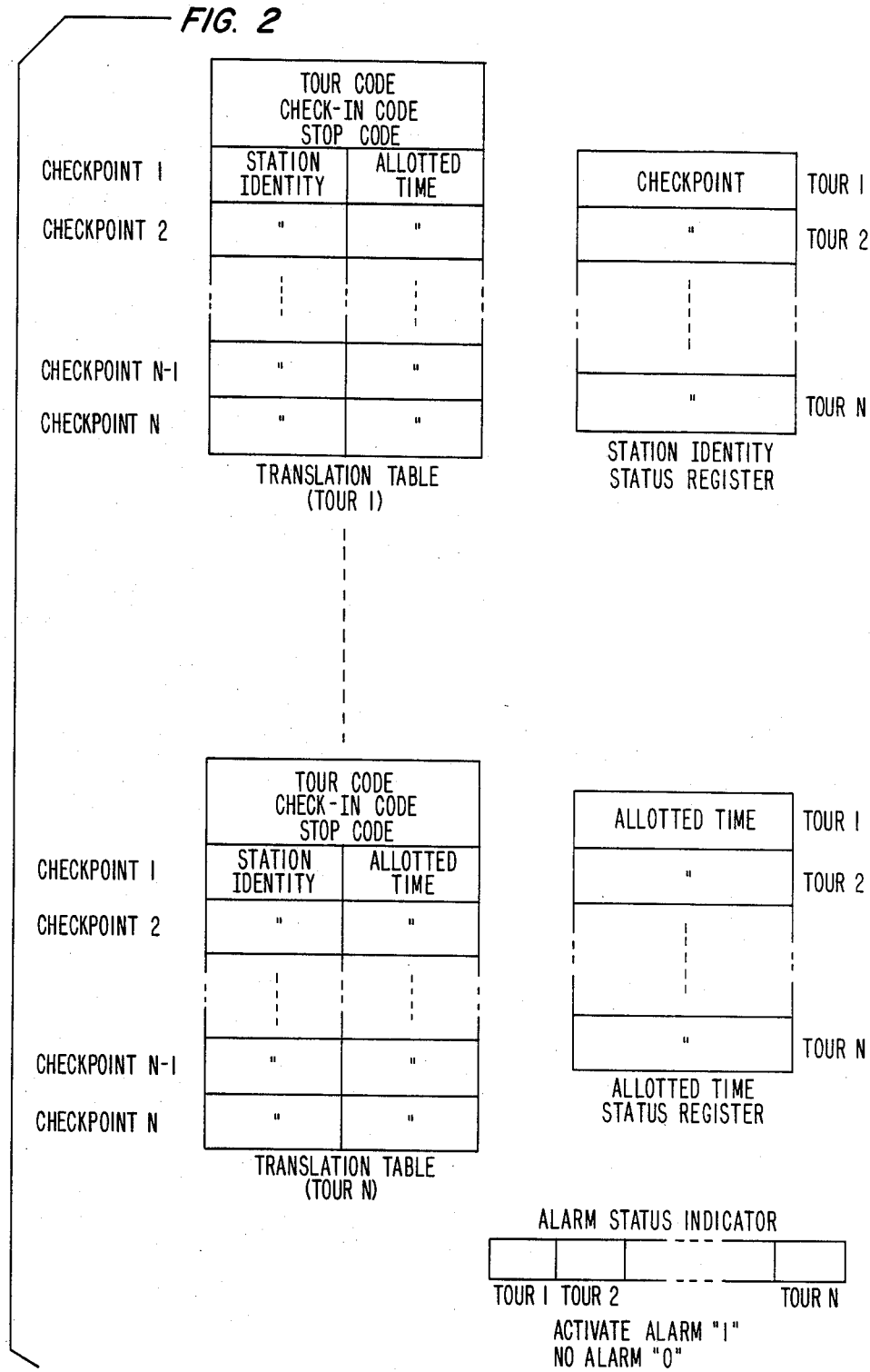
FIG. 2 illustrates the structure of the memory associated with the security algorithm.

FIG. 2 illustrates the memory structure of the security monitoring system. This memory structure is contained in main memory 108-a of control processor 108 and comprises translation tables for tour 1 through tour n, a station identity status register and an allotted time status register. In particular, each translation table is associated wtih one of a plurality of guard tours 1 through n. Each translation table is additionally associated with a specified tour code. The tour code identifies the appropriate translation table required for a selected tour. As previously described, each tour comprises a designated number of specified checkpoints. The number of checkpoints included in a tour is discretionary and may be dependent on the proximity of station sets in a particular building location, such as, for example, a single wing in the Pentagon building. Each checkpoint is associated with a station identity and an allotted time as illustrated in the translation table (tour 1) of FIG. 2. The station identity indicates which of the plurality of station sets comprising the PBX is included in the tour and therefore serves as a checkpoint. The identity of the station set may be specified by, for example, an extension number. The allotted time is a specified unit of time which indicates the amount of time allotted for a tour guard to reach each checkpoint. The translation table additionally includes a memory location having an associated check-in code. This check-in code is the code the guard uses to check-in at each checkpoint associated with the guard's selected tour as defined by the appropriate translation table. Another memory location includes a stop code. This stop code is the code required to cancel the selected tour.

The tour translation tables represent a plurality of predefined sequentially timed checkpoints for each possible tour. The translation tables are programmable memories which allow a system programmer to modify the codes, the number of checkpoints, the identity of the stations serving as checkpoints and the allotted time to reach each checkpoint. This programming capability allows flexibility in the security system. This prevents an observer or infiltrator from detecting a pattern associated with the guard tours. The lack of pattern detection acts as a deterrent to would be intruders. In addition, only the programmer and any specified security personnel need know the number of tours and which stations are included in each tour. The programmer may then disclose the tour checkpoint sequence to the tour guard immediately prior to tour activation. This provides a tighter security system. However, once this information is programmed into each translation table, the tour must be executed according to the programmed sequence as defined by the associated translation table.

The security memory structure additionally includes a station identity status register and an allotted time status register. Each register contains memory locations where each memory location is associated with one of the plurality of tours. (See FIG. 2) Each status register dynamically changes throughout the progress of each tour. Station identity status register provides the identity of the checkpoint to which the guard must proceed to complete the check-in process. For example, if a guard checks in at checkpoint "1" during a selected current tour, the appropriate memory location associated with the current tour in progress reflects the "next" checkpoint in the sequence, i.e., checkpoint 2. The tour guard must then proceed to checkpoint 2 to maintain tour progress. In the above manner, station identity status register maintains a current record of the next checkpoint for each concurrently active tour.

Allotted time status register also contains memory locations that correspond to the number of available tours 1 through n. Allotted time status register dynamically reflects the current time allowable for the tour guard to reach a checkpoint in the sequence of checkpoints. For example, using the same 1 and 2 checkpoints described above, assume the tour guard checks in at checkpoint 1. The next checkpoint, 2, must be reached within a specified allotted time period. Allotted time status register reflects that time period in the appropriate memory location associated with the currently active guard tour. Allotted time status register operates in response to a security timer (not shown) contained in system timers 121 of FIG. 1. The security timer is set to a predetermined time period, i.e., the time period equals the allotted time in the allotted time status register, and operates in a manner similar to a decremental clock. As the security timer decrements, the allotted time recorded in the specified memory location periodically decrements until the allotted time status register times out. For example, if a guard has 10 minutes to reach checkpoint 2, the value 10 minutes is stored in the appropriate memory location of the allotted time status register. The security timer is set to 10 minutes and then activated. Every 1 minute, the allotted time n in allotted time status register decrements by 1 minute. Therefore, following the duration of 1 minute, the memory location of the alloted time register contains 9 minutes and so on. The value in the memory location changes to a lesser time with each minute. The allotted time status register times out when a "0" is contained in the appropriate memory location associated with the current tour in progress. Both status registers are concurrently updated throughout the tour progression.

If a tour progresses in the orderly sequence as specified by the associated tour translation table, at the conclusion of a tour, the alarm status register reflects this condition. In particular, the alarm status register comprises memory locations that correspond to tours 1 through n as represented by the tour translation tables. Each memory location can contain either one of two bits which indicates whether an alarm is active or inactive. An alarm is activated in response to a "1" bit. The conditions which generate an alarm are discussed subsequently. No alarm is activated when a "0" bit is present.

The above-description discusses the structure of the security monitoring system's memories. These memories respond to the security algorithm. The following description discusses the implementation and operation of the security monitoring algorithm with respect to the above-described memory structure.

Security Monitoring System Operation

For ease of description, only a single tour executed by two guards is described; it is understood that a plurality of concurrent tours associated translation tables are administrable concurrently by control processor 108. Assume the following conditions. A building includes the PBX of FIG. 1 where the PBX interconnects a plurality of station sets such as stations 100-1 through 100-n. The system programmer has designated the sequence of stations that comprise the tour and entered these designations into an associated tour translation table such as the translation table (tour 1) of FIG. 2. The system programmer has additionally designated the amount of time required between each sequential check-in at the various designated checkpoints. Further, for this example, two security personnel are present, one, a security control guard at a central control such as alarm indicator unit 102 of FIG. 1. This control guard monitors the progress of the tour and responds to any generated alarms. The other person is a security tour guard who performs the actual tour. The tour guard performs the check-ins at the designated checkpoints. A single guard may perform the tour; however, the control guard provides for a back-up person when an alarm condition exists. Assume that the guards are at the beginning of their shift and that no tour is in progress.

Figure 3:
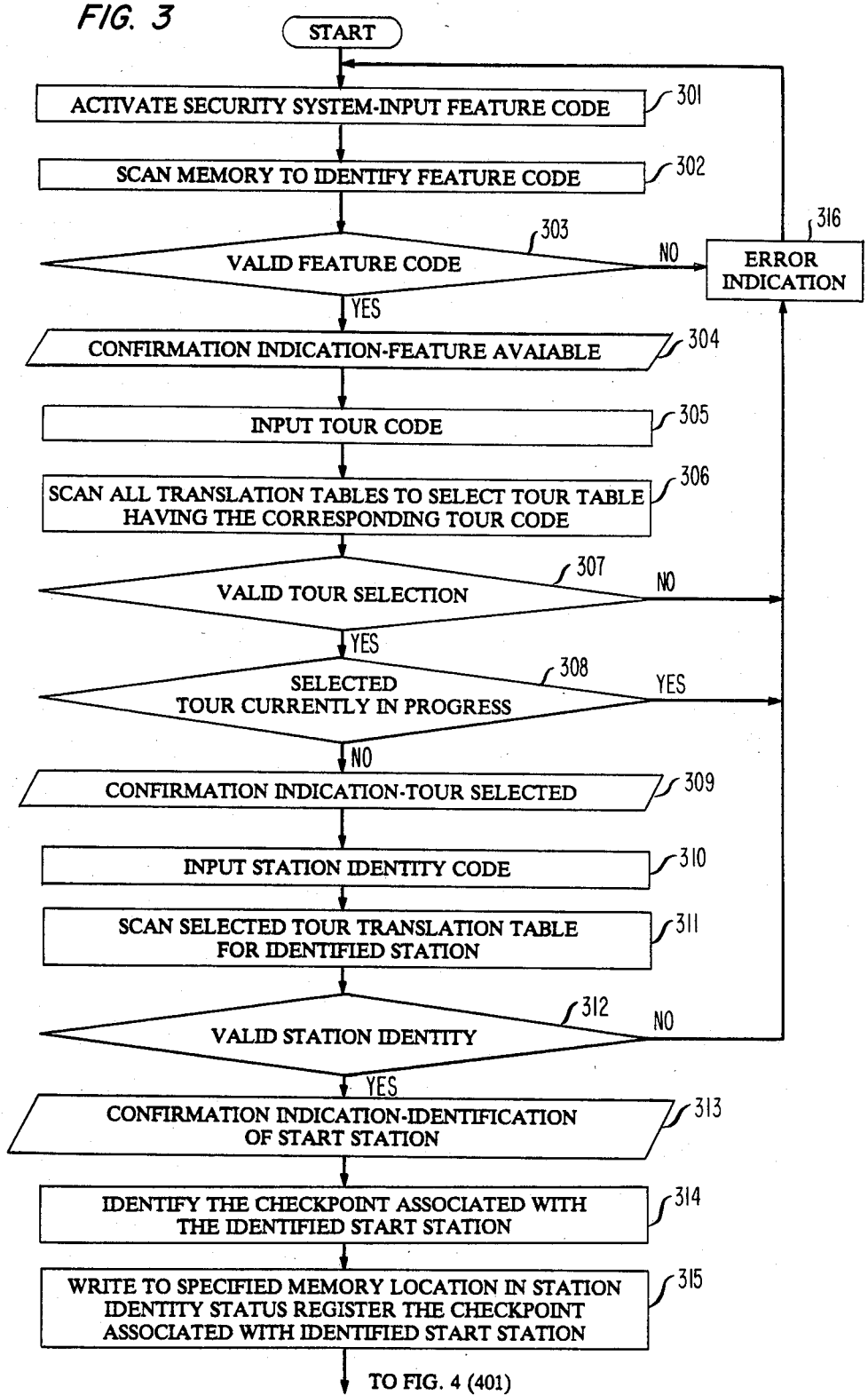

FIGS. 3, 4, 5, and 6 illustrate, in flowchart form, the steps required to implement the PBX security monitoring system feature for a single guard tour. In FIG. 3, step 301 serves as the logical start of the process, i.e., feature activation. In particular, the security control guard who is located at alarm indicator unit 102, e.g., attendant console, activates the PBS security system. The control guard "dials" a feature code associated with the security guard tour monitoring feature, step 301. Control processor 108 responds to the "dialed" feature code, and scans its main memory (108-a) to identify the feature associated with the "dialed" feature code, step 302. Control processor 108 then verifies the validity of the feature code by comparing the "dialed" feature code with the stored feature codes,i.e., is this security feature available for this PBX, step 303. If the control guard "dialed" an incorrect feature code or if the feature is unavailable, control processor 108 detects the error or unavailability of the feature and generates an error indication, e.g., intercept tone, to the control guard, step 316. The control guard in response to the error indication must either abandon the feature service request or retry "dialing" the correct feature code. The security algorithm is not activated under these conditions. The process of entering and validating the feature code prevents unauthorized personnel from activating the feature.

Assume, however, that the control guard is an authorized individual, and that the control guard has entered the correct feature code to identify the security algorithm. In response to this validated feature code, control processor 108 branches from call processing to the security algorithm contained in main memory 108-a and generates a confirmation indication, e.g., a dial tone to the control guard, step 304. This confirmation indicates that the specified feature is available for this PBX. In response to the confirmation indication, the control guard then "dials" a specified tour code, step 305. As previously discussed, a tour code identifies an assocated one of the tour translation tables. Control processor 108 scans all the translation table to identify the translation table having a corresponding tour code, step 306. In this manner, the control guard selects a particular tour. As previously stated, each translation table represents one tour.

Following the scanning process, control processor 108 compares the "dialed" tour code with each translation table tour code to validate the tour selection, i.e., does the selected tour exist, step 307. If the control guard "dials" an incorrect tour code or the selected tour does not exist, control processor 108 generates an error indication, e.g., an intercept message which indicates that an incorrect tour code has been entered, to the control guard, step 316. The security system is not activated under these conditions. The security control guard must then go "on-hook" and reinitiate the entire process again by "dialing" the security system feature code and either "dialing" the correct tour code or selecting a different tour. These steps serve as additional precautionary measures to eliminate unauthorized tour code entry.

Assume that the tour code is correct and such a tour exists. Control processor 108 then detects whether the selected tour is currently in progress, step 308. If the tour is in progress, control processor 108 generates an error indication, e.g., an intercept message stating that the selected tour is in progress, to the control guard. This step prevents the disruption of a tour currently in progress.

Assume that the selected tour is not in progress. Under these conditions, control processor 108 generates a confirmation indication, e.g., a dial tone, to the control guard, step 309. This confirmation indicates that the selected tour is available. The control guard, in response to the confirmation indication, now "dials" a station identity code, step 310. As previously described, the station identity code identifies the actual station set which serves as a checkpoint in the tour. Control processor 108 responds to the station identity code and scans the selected tour translation table for the existence of the station identity code, step 311. If the station identity code is invalid, step 312, control processor 108 generates an error indication, e.g., an intercept message indicating that the station identity code is invalid to the control guard. The control guard must reinitiate the entire security system under these conditions. However, if the station identity code exists following the scanning operation, control processor 108 generates a confirmation indication, e.g., a stutter dial tone, to the control guard, step 313. Since these aforementioned steps are included in tour activation, the confirmation indicates to the control guard that the identified station is the start station included in the tour or the start checkpoint, step 314, in the selected tour. Control processor 108 detects the checkpoint number associated with the identified station. A tour may start at any checkpoint included in the selected tour. However, once a start checkpoint is determined, the remaining checkpoints must then sequentially follow the determined start checkpoint. For example, if there are 9 checkpoints with sequential designations 1 through 9, a control guard may designate a start checkpoint of 4. Thereafter, all check-ins must progress through the checkpoints in sequential order, e.g., 5, 6, 7, 8 and 9.

The above-described validation processes as indicated by steps 303, 307, 308, and 312 serve to deter unauthorized individuals from accessing the security monitoring system. A confidential sequence of correct codes must be input to activate the security feature.

Assume all validations are correct and verified, and the starting checkpoint number is identified. Control processor 108 responds under these conditions and writes, step 315, into the specified memory location associated with the selected tour of the station identity status register, the starting checkpoint number of the identified station. (See FIG. 2) Control processor 108 then scans the selected tour translation table for the associated allotted time for the starting checkpoint, step 410 of FIG. 4. As previously indicated, each checkpoint must be reached within a specified period of time. A tour guard progresses through a tour by checking-in at each checkpoint within an allotted time period. The starting checkpoint has an associated allotted time period specifying the time in which the tour guard has to reach the starting checkpoint and then, check-in. That allotted time is written into the specified memory location associated with the selected tour of the allotted time status register.

Following the identification and recording of the start checkpoint and the associated allotted time to reach that start checkpoint, control processor 108 sets, step 403, and immediately activates, step 404, the security timer previously described. Control processor 108 detects which of the plurality of timers matches the allotted time stored in the allotted time status register. Processor 108 immediately activates that security timer which begins decrementing from its set time to zero. In response to some period of time, e.g., one minute, the security timer periodically decrements the allotted time status register, step 405. The security system is now active and the tour guard may now start his/her tour.

Assume the tour guard is now walking the prescribed tour route as defined by the sequential list of checkpoints included in the selected tour translation table. While the tour guard is progressing toward the start checkpoint, control processor 108 maintains a continuous scanning of the allotted time status register, step 406. Two alternative actions are possible following system activation: (1) the tour guard reaches the checkpoint and checks-in, or (2) the tour guard does not reach the checkpoint and the associated allotted time elapses. Assume the latter first, i.e., that the tour guard does not reach the first checkpoint in the allotted time. Control processor 108, while scanning the allotted time status register, detects that the allotted time status register has timed out, step 415. In response to the detected time-out, control processor 108 sets into a specified memory location associated with the currently active selected tour of the alarm status indicator, an activated alarm bit, a "1". (See FIG. 2, step 416). Control processor 108 generates, in response to the set bit, an alarm, step 417, and applies this alarm to alarm indicator unit 102 of FIG. 1 where the control guard is present. The control guard detects this alarm indication and takes the appropriate action, e.g., notify authorities or send a back-up guard. Following the generation of the alarm, control processor 108 clears all the registers and deactivates the security timer for the currently active selected tour, step 418. These operations cancel the tour, step 419, and no further check-ins are possible. The tour ends.

Figure 4:
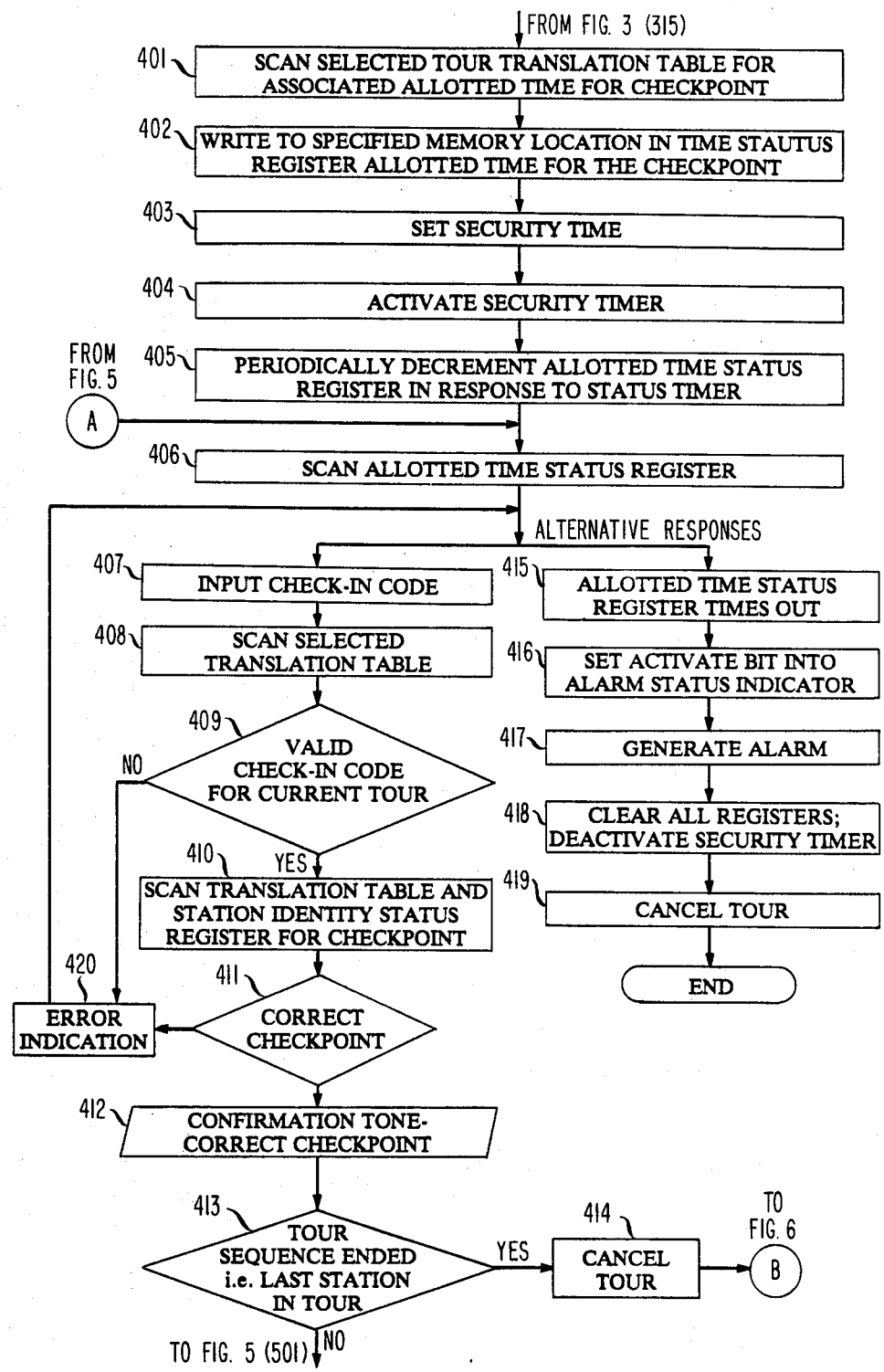

However, the alternative response is that the tour guard reaches the start checkpoint prior to the elapse of the allotted time period, step 406 of FIG. 4. Assume that the tour guard has reached the start checkpoint. The tour guard checks-in by "dialing" a check-in code, step 407. As previously described, each tour has a corresponding check-in code. Control processor 108 scans the selected tour translation table to detect the check-in code for the tour currently in progress, step 408. Control processor 108 then performs a comparison function of the "dialed" check-in code with the check-in code stored in the appropriate memory location of the selected tour translation table, step 409. If the check-in code is incorrect, control processor 108 generates an error indication, e.g., an intercept tone, to the tour guard, step 420. The tour guard must retry the check-in code again before a time-out occurs and control processor 108 cancels the tour. If the check-in code is correct, control processor 108 then performs two scanning operations, step 410. A first scanning operation determines whether or not the tour guard's checkpoint is included in the tour, step 411. Processor 108 compares the identity of the currently active checkpoint with all the checkpoints included in the currently active tour as defined by the selected tour translation table. If the selected translation table does not include this checkpoint, control processor 108 generates an error indication, e.g., an intercept tone, to the tour guard, step 420. Additionally, if the checkpoint is out of sequence as detected by control processor 108, processor 108 also generates an error indication, steps 410, 411, and 420. In particular, control processor 108 identifies the station identity of the tour guard's checkpoint by scanning the selected tour translation table. Control processor 108 then identifies the corresponding checkpoint number for the identified station. Following the identification of the checkpoint number, the identified checkpoint number is compared against the checkpoint number stored in the station identity status register. If the checkpoint numbers do not match, then the checkpoint is out of sequence and the tour cannot progress. The tour guard is required to re-enter the correct check-in code from the appropriate checkpoint prior to a time-out by the allotted time status register.

Assume that the guard has "dialed" the appropriate check-in code and that the checkpoint is in the appropriate sequence. Control processor 108 then generates a confirmation indication, e.g., stutter dial tone to the tour guard, step 412. Following the confirmation indication, control processor 108 scans the selected tour translation table to determine if there are additional checkpoints, step 413. Control processor 108 scans the selected translation table to determine if this checkpoint was the last checkpoint in the sequence. Following the last checkpoint in the sequence, the next readable memory location of the selected translation table contains information indicating that the previously identified checkpoint was the last checkpoint. In response to this indication, control processor 108 cancels the tour, step 414. The process of cancelling the tour is discussed subsequently.

Assume that the previous checkpoint was the start checkpoint as has been described and therefore, control processor 108 scans the selected tour translation table to identify the next checkpoint in the sequence, step 501 of FIG. 5. Control processor 108, then, overwrites into the specified memory location of the station identity status register, the next checkpoint in the sequence, step 502. Further, control processor 108 scans the selected tour translation table for the associated allotted time for the next checkpoint, i.e., the allotted time period in which the tour guard has to reach the next checkpoint, step 503. Control processor 108 then overwrites into the specified memory location of allotted time status register the allotted time for the check-in at the next checkpoint, step 504. In the above-described manner, the two registers are dynamically changing with respect to each checkpoint during a currently active tour. Following the writing of the checkpoint information into the appropriate registers, control processor 108 resets the appropriate security timer having a time period corresponding to the allotted time and activates the decremental timer, steps 505 and 506. Thereafter, as previously described, the security timer periodically decrements the alloted time status register during tour progress, step 507.

The tour guard, now, has an allotted amount of time in which to reach the next checkpoint.

Processing operations return to point A of FIG. 4 and processing progresses to step 406. Control processor 108 maintains continuous scanning of the allotted time status register. The time directed check-in sequence at the checkpoints included in the tour repeats in the same manner as described above. The guard continues the sequential check-ins to complete the tour. No alarm is generated, unless a guard fails to properly check-in at the appropriate checkpoint within the allotted time. In the above manner, the currently installed PBX security algorithm monitors a guard's tour.

Referring back to FIG. 4, step 414, assume the tour is now complete and that control processor 108 has detected the last checkpoint in the sequence. The following discussion describes the process of cancelling the currently active tour. There are two available cancellation options, automatic and manual. The steps associated with these are shown in the flowchart for on FIG. 6. To automatically cancel the tour, control processor 108 detects that the last checkpoint in the sequence has been reached. In response to this detection, control processor 108 automatically clears all the status registers and deactivates the security timer, step 601. Following the clearing and deactivation process, the tour ends, step 602. This option is reasonable if the control guard completes his work shift and leaves or is unavailable.

Assume the control guard remains at alarm indicator unit 102 of FIG. 1. To cancel the tour manually, the control guard must activate the manual cancellation switch (not shown) on indicator unit 102. Following activation, the control guard ends the tour by "dialing" the tour-stop code associated with the selected tour translation table, step 603. Control processor 108 scans the selected tour translation table to identify the stop code, step 604. A tour terminates only if the tour-stop code is correct. If the stop code is not valid, i.e., incorrect, control processor 108 detects the incorrect stop code and generates an error indication, e.g., an intercept tone, to the control guard, steps 605 and 609.

Assume the stop code is correct. In response to this correct stop code, control processor 108 clears all registers and deactivates the security timer, step 606. Concurrently, control processor 108 generates a confirmation indication, e.g., a stutter dial tone, to the control guard, step 607, to indicate that the currently active tour is canceled. The tour ends, step 608. This option is available so that a tour is not canceled until the tour guard returns to the location of the control guard. In this manner, the physical presence of the tour guard is verification to the control guard that the tour was successfully completed.

The above-described PBX security system discloses a flexible security arrangement that discretely monitors a guard's activity by utilizing conventional PBX equipment. This arrangement provides a tighter and less visible security system for a building that utilizes a security checkpoint arrangement as the security system.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. In a PBX serving a plurality of stations which are scanned by a PBX control processor to provide a plurality of various PBX services to each of said PBX stations in response to service requests generated from each of said stations, a method for operating said PBX to provide a guard monitor check-in service comprising the steps of:

- storing one or more guard tour lists containing entries representing a time-ordered sequence of guard check-ins at selected ones of said stations to serve as station checkpoints for one or more concurrently administrable guard tours;
- transmitting guard tour selection signals from any of said stations to said control processor to activate a selected one of said guard tours;
- generating sequentially a check-in service request at each of said station checkpoints included in the one of said lists associated with said selected guard tour; verifying in response to said check-in service request that said station checkpoint is one of said stations included in the one of said lists associated with said selected guard tour; and
- applying an alarm signal to an alarm unit in response to an interruption of said time-ordered sequence of guard check-ins.

2. The method of claim 1 wherein said step of verifying includes the steps of:
- identifying said station checkpoint in response to said generated check-in service request;
- comparing said identified station checkpoint with said selected stations serving as station checkpoints in the one of said lists associated with said selected guard tour; and
- providing an alarm signal in response to a comparison when said station checkpoint does not match an associated sequential one of said selected stations serving as station checkpoints in the one of said lists associated with said selected guard tour.

3. The method of claim 1 wherein said step of verifying includes the steps of:
- specifying said time-ordered sequence according to relative prescribed allotted time periods between said guard check-ins at each one of said station checkpoints;
- activating a timer having a time period equal to each of said allotted time periods; and
- generating an alarm signal when said check-in does not occur in an elapsed time.

4. The method of claim 1 or 17 wherein said method further includes the steps of:
- generating one or more guard tour lists having bifurcated memory portions where each guard tour list corresponds to an associated guard tour;
- entering into a first one of said memory portions data listing a finite number of said PBX stations to serve as station checkpoints; and
- entering into a second one of said memory portions data listing the time associated with a guard check-in at the associated station checkpoint.

5. The method of claim 4 wherein said method further includes the steps of:
- writing the identity of the station checkpoint following said identified station checkpoint in the one of said lists associated with said selected guard tour into a first memory store where said identity is stored until the next guard check-in; and
- writing from said second memory portion said data listing the time associated with a guard check-in at said following station checkpoint into a second memory store where said associated time data is stored until the next guard check-in.

6. A method utilizing a standard PBX having a control processor, which provides PBX services to a plurality of standard PBX stations in response to generated service requests, to provide one or more concurrently administrable guard tours where each guard tour includes PBX station checkpoints and where a guard checks-in at each one of said station checkpoints in a sequential time-referenced manner wherein said method includes the steps of:

- specifying one or more guard tour lists containing entries representing a time-ordered sequence of guard check-ins at selected one of said stations to serve as said station checkpoints;
- transmitting guard tour selection signals from any of said stations to said control processor to activate a selected one of said guard tours;
- generating sequentially a security service request at each of said station checkpoints included in said selected guard tour;
- scanning, in response to each security service request, said stations serving as station checkpoints to identify the one of said station checkpoints generating said security service request;
- comparing said identified station checkpoint against the one of said guard tour lists associated with said selected guard tour; and
- generating, in response to the step of comparing, an alarm when said identified station checkpoint does not match said sequentially time-referenced station checkpoints contained in the one of said guard tour lists associated with said selected guard tour.

7. The method of claim 6 wherein said method further includes the steps of:
- generating one or more first sequential lists of station checkpoints to indicate said check-in sequence for each of said concurrently administrable guard tours; and
- generating one or more second sequential lists each containing data identifying a check-in time associated with each of said station checkpoints included in a corresponding one of said first sequential lists to define said time-referenced manner for each of said concurrently administrable guard tours.

8. The method of claim 6 wherein said method further includes the steps of:
- writing into a first memory portion the identity of a next station checkpoint in one of said first sequential lists when said guard checks-in at said identified station checkpoint;
- writing into a second memory portion the value of a check-in time associated with said identified next checkpoint; and
- stopping the administration of said selected guard tour when the station generating the next security service request in said selected guard tour does not match said next identified station checkpoint or said associated check in time.

9. A method of operating a standard PBX having a control processor, containing a main memory where the control processor controls and administers a plurality of different call processing operations in response to service requests received from a plurality of connected PBX stations, to provide a security guard monitoring service by defining a plurality of independent guard tours concurrently administrable by the control processor where each of the plurality of tours includes selected stations serving as checkpoints, said method comprising the steps of:

allocating portions of said main memory to define a plurality of tables each of which lists the check-in procedure for a guard tour where each table is identified by a unique prescribed guard tour code;

selecting, in response to a guard tour service request from any of said stations identifying a guard tour code, the one of said tables identified by said guard tour code; and executing said security guard monitoring processing operation according to the check-in procedure defined in said table identified by said guard tour code when a security guard follows said guard check-in procedure.

10. The method of claim 9 wherein said step of allocating further includes the steps of:

entering into a first portion of each of said tables data identifying a sequence of stations serving as checkpoints included in each tour; and entering into a second portion of each of said tables a sequence of check-in times associated with said sequence of stations serving as checkpoints included in each tour.

11. The method of claim 9 wherein the step of selecting further includes the step of:

dialing said guard tour code from a central control location of the PBX.

12. The method of claim 10 wherein the step of executing further includes the steps of:

dialing by said security guard at a current checkpoint a specified guard code associated with said current checkpoint to check-in at said current checkpoint;

writing into a first memory store included in said main memory the identity of the next checkpoint in said sequence of checkpoints in response to said check-in at said current checkpoint; and writing into a second memory store included in said main memory a value of an associated specified check-in time corresponding to said next checkpoint in said sequence of checkpoints in response to said check-in at said current checkpoint.

13. The method of claim 9 wherein said method further includes the step of:

generating an alarm when said check-in procedure is contravened.

* * * * *